United States Patent
Luss et al.

(10) Patent No.: US 7,730,520 B2
(45) Date of Patent: Jun. 1, 2010

(54) AUTOMATED ADAPTIVE METHOD FOR IDENTITY VERIFICATION WITH PERFORMANCE GUARANTEES

(75) Inventors: Hanan Luss, Marlboro, NJ (US); Arnold L. Neidhardt, Middletown, NJ (US); Komandur R. Krishnan, Bridgewater, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1036 days.

(21) Appl. No.: 11/443,909

(22) Filed: May 31, 2006

(65) Prior Publication Data

US 2007/0282610 A1    Dec. 6, 2007

(51) Int. Cl.
G06F 21/00    (2006.01)
(52) U.S. Cl. .............................. 726/2; 726/4
(58) Field of Classification Search ................ 726/1–20
See application file for complete search history.

(56) References Cited

U.S. PATENT DOCUMENTS

| 6,816,901 | B1 | 11/2004 | Sitaraman et al. |
| 2003/0154138 | A1 | 8/2003 | Phillips et al. |
| 2003/0154406 | A1 | 8/2003 | Honarvar et al. |
| 2004/0172562 | A1 | 9/2004 | Berger et al. |
| 2005/0033991 | A1 | 2/2005 | Crane |
| 2005/0097364 | A1* | 5/2005 | Edeki et al. .................. 713/201 |
| 2008/0292143 | A1* | 11/2008 | Kyle .......................... 382/115 |

OTHER PUBLICATIONS

International Search Report, dated May 14, 2008 (2 pages).

* cited by examiner

Primary Examiner—Nasser Moazzami
Assistant Examiner—Lisa Lewis
(74) Attorney, Agent, or Firm—Philip J. Feig

(57) ABSTRACT

This invention provides an automated adaptive method for identity verification of claimants that attempt to get access into a resource by responding to a sequence of identifiers. The sequence has a specified maximal length and the identifiers are partitioned into multiple groups where identifiers in the same group are correlated and identifiers in different groups are not correlated. The method guarantees that an impostor will be accepted with a probability that does not exceed a specified parameter and that a legitimate claimant will be rejected with a probability that does not exceed a different specified parameter. The method also computes the probabilities that a legitimate claimant, or an impostor, will terminate an interrogation session with an inconclusive result, which would necessitate further manual interrogation. The method is adaptive as the conditional probabilities of an impostor's responses change throughout a session of interrogation.

9 Claims, 3 Drawing Sheets

| Group | Identifier 1 | Identifier 2 | Identifier 3 |
|---|---|---|---|
| 1 | X | | |
| 2 | X | | |
| 3 | X | X | X |
| 4 | X | X | X |
| 5 | X | X | |
| 6 | X | X | |
| 7 | X | | |
| 8 | X | X | X |

FIGURE 1

AUTOMATED ADAPTIVE METHOD FOR IDENTITY VERIFICATION WITH PERFORMANCE GUARANTEES

FIELD OF THE INVENTION

The present invention relates to identity verification of claimants. Specifically, the invention relates to claimants attempting to access a resource that provides information, services, or products. The invention provides an automated adaptive method that attempts to verify claimant identities.

BACKGROUND OF THE INVENTION

Today, businesses often rely on customers that access an automated resource in order to receive information, services or products. When a claimant requests access to a resource, he/she must respond to a sequence of questions about information related to a legitimate claimant, called identifiers. The resource has in storage in a trusted, previously-created database the correct responses to each of these identifiers for each legitimate claimant. Identifiers are partitioned into multiple groups, where identifiers in the same group are correlated and identifiers in different groups are regarded as being independent. For example, the identifiers may include just one voice sample, analyzed through voice recognition techniques. This identifier is likely to be regarded as being independent of any other identifier and therefore would be a group by itself. A different group may include dynamic personal identifiers such as last hotel stayed in, last sport event attended, and last show seen, where the dependence among these identifiers reflects the likelihood of a potential impostor having observed these activities by the legitimate claimant or person. Yet another group may include information on personal documents such as driver license number and multiple credit card numbers, and so forth, where the dependence among these identifiers reflects the possibility of a potential impostor having acquired the person's wallet. Some identifiers, such as voice samples or fingerprints, could be treated as providing more reliable identifiers, whereas others, such as credit-cards, do not offer the same degree of certainty, owing to the possibility of stolen or fraudulent cards.

A claimant is probed with a sequence of identifiers. The claimant's response to a single identifier is either a match, a no-match, or ambiguous. A match means the response matches the information in the database, a no-match means that it does not match the response in the database, and ambiguous means that a determination cannot be made of whether the response is a match or a no-match. The latter may occur, for example, when responding to a voice recognition identifier due to noise on the communications line. The probing session terminates either with accepting the claimed identity, thus granting the claimant access to the resource; or with rejecting the claimed identity, thus denying access to the claimant; or with terminating the session inconclusively, thus sending the claimant to further manual interrogation, typically conducted by call center personnel.

L. T. Honarvar, B. R. Witte, S. C. Fatigante, and G. L. Harless, in U.S. patent application Ser. No. 10/224,564, filed Aug. 21, 2002, entitled "User Authentication System and Methods Thereof", provide a system and method that use multiple groups of identifiers customized for each claimant. An identity is verified based on scoring methods, where a claimant may receive points for each match and lose points for each no-match. Although such scoring methods are very flexible, these methods do not provide quantified guarantees regarding the probabilities of erroneously accepting an impostor or erroneously rejecting a legitimate claimant. Also, these methods do not provide a quantified probability of terminating a session inconclusively.

The present invention provides an adaptive method that would be implemented on an automated system, with quantified performance guarantees, subject to the accuracy of the estimates of the basic probabilities that serve as inputs to the method. Specifically, a potential impostor would be erroneously accepted with a computed probability that does not exceed $\alpha$ (where $\alpha$ is a specified parameter, for example, $\alpha=10^{-6}$), and a legitimate claimant would be erroneously rejected with a computed probability that does not exceed $\beta$ (where $\beta$ is a specified parameter, for example, $\beta=10^{-5}$). Moreover, the number of identifiers used in an identity verification session is limited to S (where S is a specified parameter, for example, S=8). Thus, if after probing S identifiers, a claimant cannot be reliably accepted or rejected, the session terminates inconclusively. The method computes the probabilities that a session for a legitimate claimant would grant access, deny access, or terminate inconclusively, and the probabilities that a session for an impostor would grant access, deny access, or terminate inconclusively. These probabilities depend on the specified values of the parameters $\alpha$, $\beta$ and S, and facilitate designing the access control for a resource with the appropriate balance among these parameters. These probabilities also provide guidelines for whether better identifiers, with better differentiation between a legitimate claimant and an impostor, are needed. The method is adaptive as the sequence of identifiers probed during a session depends on the responses provided by the claimant. Moreover, an impostor's conditional probabilities of responding with a match or a no-match are recomputed after each response for all correlated identifiers.

SUMMARY OF THE INVENTION

The present invention provides a method for identity verification of claimants that attempt to gain access to a resource. The resource may provide valuable information, services, or products.

Consider a claimant for identity (a legitimate claimant or an impostor) r, who requests access to the resource. The claimant must respond to a sequence of questions about pieces of information, called identifiers. The resource has in storage in a trusted, previously-created database the correct responses to each of these identifiers for the claimed identity. Each identifier is characterized by several estimates of probabilities provided as input to the method, during the earlier creation of the record for identity r. These include the probabilities that a legitimate claimant's response would match the information in the database, would not match the information in the database, or would be ambiguous.

Identifiers are partitioned into multiple groups, represented by an index g, where identifiers in the same group are correlated and identifiers in different groups are regarded as being independent. Identifiers in the same group are correlated in the sense that a response by a claimant to one identifier in the group affects the conditional probabilities of a match or a no-match response by an impostor to other identifiers that have not yet been probed in the same group. An impostor is characterized by the probabilities that an ignorant impostor claiming identity r would respond with a match, a no-match, or an ambiguous response. An ignorant impostor may still have access to publicly available sources of information. An impostor may also be a well-informed impostor by finding a "wallet" with information on the identifiers in a group. The impostor is regarded as having a probability $\phi_g$ of finding a "wallet" for group g. A well-informed impostor's response probabilities are the same as those of a legitimate claimant. Estimates of these probabilities associated with an ignorant impostor and the probabilities of finding the "wallets" are provided as input to the method, during the earlier creation of the record of identity r. The estimates are used to compute the probabilities for a random impostor's (ignorant or well-informed) responses.

The method is adaptive as the sequence of identifiers probed during a session depends on the responses provided by the claimant. Moreover, an impostor's conditional probabilities of responding with a match or a no-match are recomputed after each response for all correlated identifiers Consider a session for a claimant for identity r. The session starts by selecting the identifier that provides the best differentiation between a legitimate claimant and an impostor. After each response, the method computes the joint probability for a legitimate claimant to provide the received responses and the joint probability for an impostor to provide the received responses. The method then determines whether the claimant can be accepted or rejected, based on the ratio between these joint probabilities. The method employs an acceptance criterion that ensures that the computed probability that an impostor will be erroneously accepted, given the responses, does not exceed a user's specified parameter, denoted as $\alpha$. Similarly, the rejection criterion ensures that the computed probability that a legitimate claimant will be rejected, given the responses, does not exceed another user's specified parameter, denoted as $\beta$. If the claimant is neither accepted nor rejected, and a user-specified number of identifiers, denoted as S, have been probed, the session terminates ambiguously. The claimant is then sent to more questioning, typically handled by call center personnel. If less than S identifiers were probed, the impostor's conditional probabilities of responses to the remaining identifiers are recomputed, the next best identifier is selected, and the process is repeated.

The method also computes the probability that a session for a legitimate claimant for identity r would grant access, deny access, or terminate ambiguously, and the probability that a session for an impostor would grant access, deny access, or terminate ambiguously. These probabilities depend on the parameters $\alpha$, $\beta$, and S. A practical method must ensure that the proportion of ambiguous termination is reasonably small; otherwise too many claimants are sent to call centers. If the resulting probability of inconclusive termination is perceived as too high, the values of one or more of the parameters $\alpha$, $\beta$, and S can be changed. New identifiers that would differentiate better between a legitimate claimant and an impostor can also be added.

A principal object of the present invention is, therefore, the provision of an automated adaptive method for identity verification of a claimant with quantified performance guarantees.

Another object of the invention is the provision of a method for identity verification of claimants, including an acceptance criterion that ensures that the computed probability that an impostor will be erroneously accepted, given the responses, does not exceed a user's specified parameter, denoted as $\alpha$.

A further object of the invention is the provision of a method for identity verification of claimants, including a rejection criterion that ensures the computed probability that a legitimate claimant will be rejected, given the responses, does not exceed another user's specified parameter, denoted as $\beta$.

A still further object of the invention is the provision of a method for identity verification of claimants using a session with a predetermined quantity of identifiers S that computes the probabilities that a legitimate claimant would be granted access or denied access or that the session would be terminated inconclusively, where these probabilities depend on the parameters $\alpha$, $\beta$, and S.

A still further object of the invention is the provision of a method for identity verification of claimants using a session with a predetermined quantity of identifiers S that computes the probabilities that an impostor would be granted access or denied access or that the session would be terminated inconclusively, where these probabilities depend on the parameters $\alpha$, $\beta$, and S.

Further and still other objects of the present invention will become more clearly apparent when the following description is read in conjunction with the accompanying drawings.

BRIEF DESCRIPTION OF THE DRAWINGS

FIG. 1 is a table illustrating the record stored in a trusted database for an identity.

DETAILED DESCRIPTION

Figure 2:
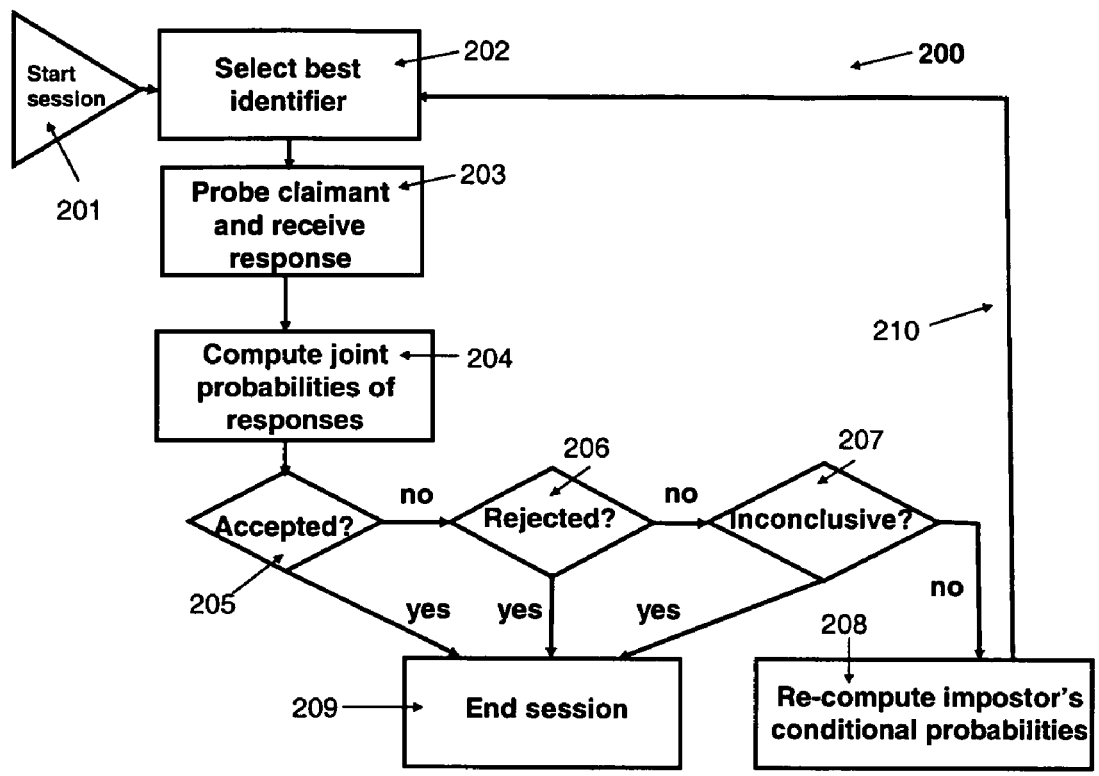
FIG. 2 is a flow diagram of an identity verification session for a claimant.

Referring now to the figures and to FIG. 1 in particular, there is shown the record 100 stored for a single identity, referred to as identity r. The following notation for input parameters is used:

TABLE 1

Input Parameters for Identity r

| Notation | Parameter Description |
|---|---|
| r | Index for record r, where record r stores trusted identifiers for identity r. |
| k | Index for identifiers. |
| g | Index for a group of identifiers, g = 1, 2, . . . , G, where each identifier k is uniquely mapped into one of the groups and G is the number of groups |
| $id_r(k)$ | The trusted information of identifier k in record r. |
| $PL_r(k = match)$ | The input estimate of the probability that a legitimate claimant for identity r would respond with a match to identifier k. |
| $PL_r(k = no\text{-}match)$ | The input estimate of the probability that a legitimate claimant for identity r would respond with a no-match to identifier k. |
| $PIO_r(k = match)$ | The input estimate of the probability that an ignorant impostor claiming identity r would respond with a match to identifier k. |
| $PIO_r(k = no\text{-}match)$ | The input estimate of the probability that an ignorant impostor claiming identity r would respond with a no-match to identifier k. |

TABLE 1-continued

Input Parameters for Identity r

| Notation | Parameter Description |
| --- | --- |
| $c_r(k)$ | "Cost" of identifier k for identity r. These parameters would help to vary the probed identifiers in successive sessions for a claimant of identity r. |
| $\phi_g$ | The input estimate of the probability that an impostor finds a "wallet" with the trusted information of the identifiers in group g, which make the responses as good as those of a legitimate claimant. |

The record for identity r is partitioned into groups 101. The example in FIG. 1 includes 8 groups 102-109, where g is used as an index for the groups. Each group has one or more identifiers, where in this example the number of identifiers in a group is limited to no more than 3. Identifier 1 in any of the eight groups is denoted as 110, identifier 2 in any of the groups is denoted as 111 and identifier 3 in any of the groups is denoted as 112. An X in a cell of FIG. 1 indicates an identifier. Thus, for example, group 102 has only one identifier and group 104 has three identifiers. Each group g has also the input parameter $\phi_g$. An identifier is indexed by k. The input available for each identifier k includes $id_r(k)$, $PL_r$(k=match), $PL_r$(k=no-match), $PI0_r$(k=match), $PI0_r$(k=no-match), and $c_r(k)$. The response to an identifier may be ambiguous. Although not required by the method, it is assumed that the probability of an ambiguous response, denoted as $PV_r$(k=ambiguous) is the same for a legitimate claimant and for an ignorant impostor as, typically, an ambiguous response is incurred due to noise in a communication line and other ambiguities due to accents, poor hearing, and so forth. The method can readily be changed to handle different probabilities of ambiguous responses by a legitimate claimant and by an ignorant impostor. Note that $PL_r$(k=match)+$PL_r$(k=no-match)+$PV_r$(k=ambiguous)=1 and $PI0_r$(k=match)+$PI0_r$(k=no-match)+$PV_r$(k=ambiguous)=1. The identifiers in different groups are regarded as being independent in the sense that if an impostor was able to obtain information of identifiers in one group, it does not change the probability that he/she was able to obtain information on identifiers in other groups. On the other hand, identifiers in the same group are correlated in the sense that a response by a claimant to one identifier in the group affects the probabilities of a match or no-match response by an impostor to other identifiers that have not yet been probed in the same group. The precise computation of these probabilities will be explained later.

The groups may include identifiers that are required, identifiers obtained from readily available databases, and identifiers selected by the legitimate claimant when the record is established. For example, in FIG. 1, group 102 may include a voice sample and group 103 may include a password, wherein both identifiers are required. Group 104 may include dynamic personal information obtained from databases, such as last hotel stayed at, last flight taken, and last restaurant where a meal was eaten. These identifiers are in the same group as they are typically found in the same source of information, e.g., credit card reports. Group 105 may include information on personal documents such as driver license number, and some credit card numbers. Group 106 may include geographic information like, closest hardware store to the place of residency of the legitimate owner of the identity, and the street that crosses the legitimate owner's street to the right of his/her house, and so forth.

FIG. 2, is a flow diagram 200 illustrating a typical session for a claimant for identity r. A record for identity r with G groups of identifiers was previously established, as explained in conjunction with FIG. 1. At a start of a session, at step 201 a claimant requests access to a resource. At that time the system has knowledge of all the information in record r.

The generic notation outcome is used for the response to identifier k (match, no-match, or ambiguous). The input parameter $\phi_g$, $0 \leq \phi_g \leq 1$, is the probability that an impostor finds a "wallet" with the information for all identifiers in group g. Consider identifier k ∈ g and suppose no other identifiers from group g have so far been probed. Let $PI_r$(k=outcome) be the probability that a random (ignorant or well-informed) impostor provides an outcome response for identifier k. This probability is a combination of $PI0_r$(k=outcome) and of $PL_r$(k=outcome). Specifically, it is:

$$PI_r(k=\text{outcome})=(1-\phi_g)PI0_r(k=\text{outcome})+\phi_g PL_r(k=\text{outcome}). \quad (1)$$

Note that when it is assumed that $PI_r$(k=ambiguous)=$PL_r$(k=ambiguous)=$PV_r$(k=ambiguous), Equation (1) can then rewritten as:

$$PI_r(k=\text{match})=(1-\phi_g)PI0_r(k=\text{match})+\phi_g PL_r(k=\text{match}), \quad (2.1)$$

$$PI_r(k=\text{no-match})=1-PI_r(k=\text{match})-PV_r(k=\text{ambiguous}). \quad (2.2)$$

The legitimate claimant probabilities $PL_r$(k=outcome) remain unchanged during the session; i.e.; they are independent of the claimant's responses. On the other hand, the response probabilities for a match or no-match of a random (ignorant or well-informed) impostor may change during a session, depending on the responses.

The set $K=\{k_1, \ldots, k_j, \ldots, k_q\}$ is defined as the ordered set of identifiers already probed during the session. Each of the elements in the set represents a probed identifier and the response (match, no-match, or ambiguous) provided by the claimant to that identifier. K is partitioned into G subsets, one for each group g. These subsets are denoted as $K_g=\{k \in g \ \& \ k \in K\}$ for g=1, 2, ..., G.

Select best identifier 202

The method next selects at each point in time during a session the best identifier in step 202. The following notation is introduced:

$PI_r$(k=outcome|K)=The conditional probability that a random (ignorant or well-informed) impostor claiming identity r responds with outcome to identifier k ∉ K, given that the session so far has produced the responses of K.

$P0_r(K_g)$=The joint probability that an ignorant impostor claiming identity r would provide responses as specified by the set $K_g$.

$P_r(K_g)$=The joint probability that a random (ignorant or well-informed) impostor claiming identity r would provide responses as specified by the set $K_g$.

$Q_r(K_g)$=The joint probability that a legitimate claimant of identity r would provide responses as specified by the set $K_g$.

These joint probabilities are:

$$P0_r(K_g) = \prod_{k_j \in K_g} PIO_r(k_j = outcome_j), \quad (3.1)$$

$$Q_r(K_g) = \prod_{k_j \in K_g} PL_r(k_j = outcome_j), \quad (3.2)$$

$$P_r(K_g) = (1-\phi_g)P0_r(K_g) + \phi_g Q_r(K_g), \quad (3.3)$$

where $outcome_j$ is the response to identifier $k_j$. Equation (3.3) follows directly from (3.1), (3.2), and the conception of a random impostor as behaving either ignorantly or as a legitimate claimant, depending on whether a wallet for group g is in the possession of the impostor, which happens with probability $\phi_g$.

The method selects the next identifier as the one that would approximately yield the largest expected decrease in the ratio of the joint probabilities $P_r(K)/Q_r(K)$ per unit cost. Specifically, for any identifier k that is still available for probing, the following expressions are computed:

$$G_r(k \mid K_g) = PL_r(k = \text{match})\log\left(\frac{PL_r(k = \text{match})}{PI_r(k = \text{match} \mid K_g)}\right) + \quad (4.1)$$
$$PL_r(k = \text{no-match})\log\left(\frac{PL_r(k = \text{no-match})}{PI_r(k = \text{no-match} \mid K_g)}\right)$$

and $$Value_r(k) = \frac{G_r(k \mid K_g)}{c_r(k)}. \quad (4.2)$$

The identifier that provides the largest ratio $Value_r(k)$ is selected as the best identifier that will be used. Note that since $PV_r(k=\text{ambiguous})$ is assumed to be the same for an impostor or a legitimate claimant, the corresponding term (not shown in right-hand-side of equation (4.1)) is zero. For the first identifier (sets $K_g$ are empty), the conditional probabilities are simply replaced by the prior probabilities at the beginning of the session. The conditional probabilities that will be used in subsequent iterations are computed later as will be described in conjunction with step 208. The identifier selection based on equations (4.1)-(4.2) is given as an example. Various other expressions that approximate the largest expected decrease in the ratio of the joint probabilities $P_r(K)/Q_r(K)$ per unit cost can also be used.

The "cost" parameters $c_r(k)$ can be set to one when the record for identity r is established. When identifier k is probed during a session $c_r(k)$ is increased. This would reduce the likelihood that identifier k would be used repeatedly in successive sessions by a claimant for identity r. Alternatively, instead of using cost parameters, the method can select randomly one of the N best identifiers, where N is a specified input. Both of these schemes would lead to some diversity in the identifiers probed in successive sessions.

Probe Claimant and Receive Response 203

After the best identifier is selected, the claimant is probed, and a response from the claimant is received in step 203.

Compute Joint Probabilities of Responses 204

Let $P0_r(K_g) = Q_r(K_g) = 1$ for $K_g = \emptyset$. Suppose $k \in g$ is the most recent identifier probed and $k \in K_g$. The method can compute the joint probabilities of equation (3.1) and equation (3.2) either directly or by using the following recursive equations:

$$P0_r(K_g \cup k) = P0_r(K_g)PI0_r(k=\text{outcome}), \quad (5.1)$$

$$Q_r(K_g \cup k) = Q_r(K_g)PL_r(k=\text{outcome}). \quad (5.2)$$

Let
$P_r(K)$=The joint probability that a random (ignorant or well-informed) impostor claiming identity r would provide responses as specified by the set K.

$Q_r(K)$=The joint probability that a legitimate claimant of identity r would provide responses as specified by the set K.

Let $P_r(K)=Q_r(K)=1$ for $K=\emptyset$. Suppose k is the most recent identifier probed and thus added into K. The overall joint probabilities $P_r(K)$ and $Q_r(K)$ are the products, over the groups g, of the corresponding probabilities $P_r(K_g)$ and $Q_r(K_g)$ for the individual groups g, so the method can compute the overall joint probabilities, either directly by multiplying appropriately the individual joint probabilities determined by equations (3.1), (3.2), and (3.3), or by using the following recursive equations in step 204:

$$P_r(K \cup k) = P_r(K)PI_r(k=\text{outcome} \mid K), \quad (6.1)$$

$$Q_r(K \cup k) = Q_r(K)PL_r(k=\text{outcome}). \quad (6.2)$$

Test Whether the Claimant is Accepted 205

After the joint probabilities $P_r(K)$ and $Q_r(K)$ are recomputed with the latest response, the method computes the ratio of the joint probabilities. If $$P_r(K)/Q_r(K) \leq \alpha, \quad (7)$$

then in step 205 the claimant is accepted as a legitimate claimant for identity r. Condition (7) guarantees that an impostor will be erroneously accepted with a probability that does not exceed $\alpha$. Note that the ratio test includes joint probabilities for both the legitimate claimant and the impostor. The superficially tempting acceptance condition $P_r(K) \leq \alpha$ is a necessary one for attaining the desired low probability for admitting an impostor, but it may not suffice. For instance, if K' and K" are two possible response histories that satisfy $\alpha/2 < P_r(K') \leq \alpha$ and $\alpha/2 < P_r(K'') \leq \alpha$, and if the access-control procedure were to specify granting access when encountering these histories, then the probability of an impostor gaining access would be at least as large as $P_r(K') + P_r(K'') > \alpha$, violating the design goal.

If condition (7) is satisfied, the claimant is accepted in step 205 and the session terminates as indicated by step 209.

Test Whether the Claimant is Rejected 206

After the joint probabilities $P_r(K)$ and $Q_r(K)$ are recomputed with the latest response, the method computes the ratio of the joint probabilities. If $$Q_r(K)/P_r(K) \leq \beta, \quad (8)$$

then the claimant is rejected as a legitimate claimant for identity r in step 206. Condition (8) guarantees that a legitimate claimant will be erroneously rejected with a probability that does not exceed $\beta$. Note that the ratio test includes joint probabilities for both the legitimate claimant and the impostor. The superficially tempting rejection condition $Q_r(K) \leq \beta$ is a necessary one for attaining the desired low probability for erroneously rejecting a legitimate claimant, but it may not suffice.

If condition (8) is satisfied, the claimant is rejected in step 206 and the session terminates as indicated by step 209.

Test Whether the Session Should Terminate with an Inconclusive Result 207

Suppose the session has not been terminated with an acceptance in step 205 or rejection in step 206 of the claimant. Then, if the number of identifiers probed reached a predetermined quantity S, the session terminates with an inconclusive result as indicated by step 207. If S identifiers were used, the session terminates as indicated by step 209. If less than S identifiers were used, the session continues with step 208.

Re-Compute Impostor's Conditional Probabilities 208

Suppose the latest identifier probed is in group g. In step 208 the method then re-computes the impostor's conditional probabilities for all identifiers in group g that have not yet been probed. Specifically, the method re-computes $$PI_r(k = \text{outcome} \mid K_g) = \frac{PI_r(K_g \cup k)}{(1-PI_r(K_g))PO_r(K_g)PIO_r(k = \text{outcome}) +} \quad (9)$$
$$= \frac{\varphi_g Q_r(K_g) PL_r(k = \text{outcome})}{(1 - \varphi_g) P0_r(K_g) + \varphi_g Q_r(K_g)}.$$

After the updates the session continues with a new iteration as indicated by the arrow 210 leading from step 208 to step 202 in FIG. 2.

The example below illustrates the changes in an impostor's conditional probabilities. Suppose $PI0_r(k=\text{match})=0.01$, $k \in g$, $\phi_g=0.01$, and $PL_r(k=\text{match})=0.9$ for all identifiers in group g. The probability that an (ignorant or well-informed) impostor responds with a match to the first probed identifier from group g is by equation (1) $PI_r(k=\text{match})=0.019$. Suppose the first probed identifier results in a match response. Using equation (9), the impostor's conditional probability for a match with a second identifier from group g is 0.434. Suppose the second identifier also results in a match response. The impostor's conditional probability for a match with a third identifier from group g is 0.889. Hence, after the first two matches, the impostor's conditional probability for responding with a match for the remaining identifiers in group g is almost the same as that of a legitimate claimant. Hence, there is hardly any value in probing more identifiers from group g. If the first two probes result in one match and one no-match, the impostor's conditional probability for a match with a third identifier from group g is 0.085.

Probabilities of an Inconclusive Termination, and Granting or Denying Access

An inconclusive termination of a session occurs when the number of identifiers probed reaches S and the claimant has neither been accepted nor rejected. Consider the case of a legitimate claimant. The probability of an inconclusive termination of a session for a legitimate claimant is derived by enumerating all possible sequences of responses in the session. An effective method of executing this enumeration is by building a tree, where each of the nodes of the tree would indicate a set of identifiers K that has already been probed and associated information.

Figure 3:
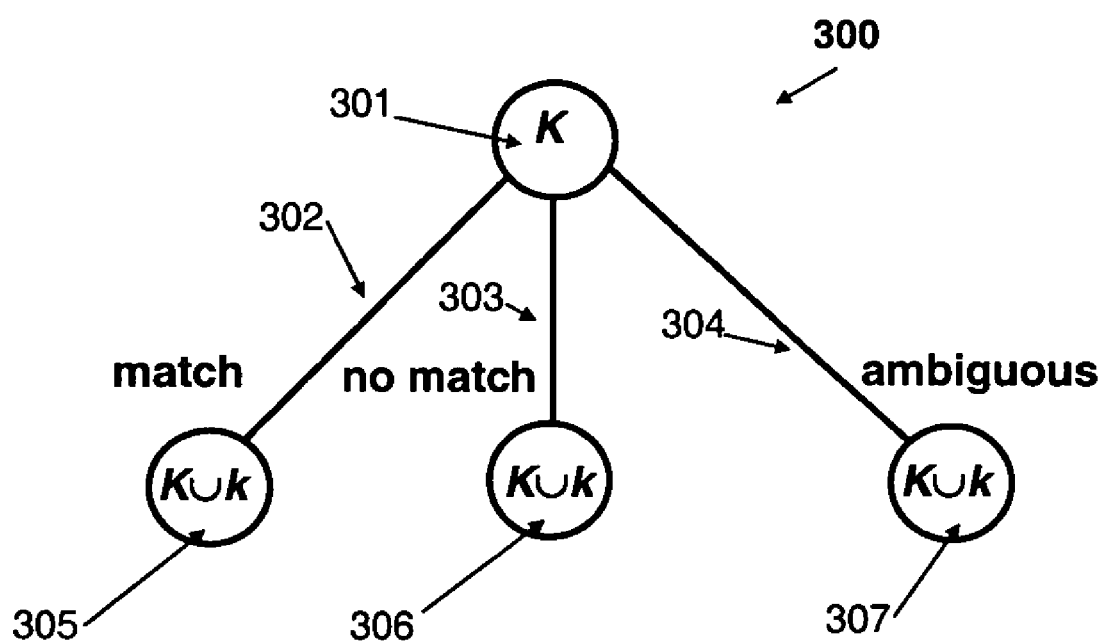
FIG. 3 graphically illustrates a portion of a decision tree used to compute probabilities of inconclusive terminations.

FIG. 3 shows a portion of a decision tree 300 having one parent node 301 and its children nodes 305, 306, and 307. Node 301 is represented by the set of identifiers K that have already been probed. The node 301 also has the values of joint probabilities $Q_r(K_g)$, $P0_r(K_g)$ for all groups g, joint probabilities $Q_r(K)$ and $P_r(K)$, and all the impostor's conditional probabilities. It is assumed in this example that the session did not terminate at node 301. The node then selects the next identifier, denoted as k, to be probed as explained above in "select best identifier 202" in conjunction with FIG. 2. The method then generates three outgoing links 302, 303, and 304 from node 301. Link 302 represents a match for identifier k and generates a new node 305. Node 305 is represented by the set of identifiers K∪k when k is a match. Node 305 computes the new joint probabilities $Q_r(K_g \cup k)$, $P0_r(K_g \cup k)$ for group g that includes identifier k, joint probabilities $Q_r(K \cup k)$, $P_r(K \cup k)$, and all the impostor's new conditional probabilities. The method then checks whether the session should be terminated or not as explained in conjunction with steps 205-207 in FIG. 2. If the answer is yes, the node is marked as terminal and will not be selected for further branching in subsequent iterations. If the session ends with an inconclusive result, $Q_r(K_g \cup k)$ is added to a counter that accumulates probabilities of inconclusive terminations. If the node is not terminal, it would be selected in a future iteration for further branching. Link 303 represents a no-match for identifier k and generates a new node 306. Link 304 represents an ambiguous response for identifier k and generates a new node 307. The computations at nodes 306 and 307 are the same as those done at node 305.

The method for computing the probability of inconclusive terminations for a legitimate claimant generates a tree starting from a root node with K=∅, which is initially treated as an unmarked node. At each iteration, the method selects an unmarked node with the set of identifiers K. The method selects the best identifier, say identifier k, as the next one to be probed and generates three links and three new nodes with a set of identifiers already probed K∪k, after which, the selected node is marked as having been handled. Note that each of the three nodes represented by the set K∪k have different responses to identifier k, one with a match, a second with a no-match, and a third with an ambiguous response. The computations done at each of the new nodes are as described in conjunction with the description of FIG. 2. Some of the new nodes may be marked as terminal, and if a node is marked as terminal due to inconclusive termination, the corresponding joint probability $Q_r(K \cup k)$ is added to a counter that accumulates probabilities of inconclusive terminations for a legitimate claimant. Otherwise, a new non-terminating node is treated as being unmarked, and is added to the set of unmarked nodes. The method then selects an unmarked node and generates three new links from that node, and so forth. The computations are completed when all nodes have been marked as either terminal or as having been handled.

The method can also compute the probability of accepting a legitimate claimant by summing all joint probabilities $Q_r(K)$ at nodes marked as terminal when the claimant is accepted, and the probability of rejecting a legitimate claimant by summing all joint probabilities $Q_r(K)$ at nodes marked as terminal when the claimant is rejected (the latter sum will not exceed β).

Likewise, the method can compute the probability of inconclusive terminations for an impostor by summing all joint probabilities $P_r(K)$ at nodes marked as terminal with inconclusive termination. The method can also compute the probability of accepting an impostor by summing all joint probabilities $P_r(K)$ at nodes marked as terminal when the claimant is accepted (the sum will not exceed α), and the probability of rejecting an impostor by summing all joint probabilities $P_r(K)$ at nodes marked as terminal when the claimant is rejected.

The above described method can be practiced on any interactive system where a claimant can interact and provide responses to probes of identifiers. Typical systems include an automated telephone system coupled to a dedicated database containing information of multiple identifiers, an interactive computer connected to a dedicated database containing information of multiple identifiers for each identity, and the like as are known in the art.

While there has been described and illustrated an automated adaptive method for identity verification with quantified performance guarantees, it will be apparent to those skilled in the art that variations and modifications are possible without deviating from the broad scope and teachings of the present invention which shall be limited solely by the scope of the claims appended hereto.

What is claimed is:

1. A method using an interactive computer for verifying the identity of a claimant attempting to access a resource comprising the steps of:
   providing a trusted database containing information of multiple identifiers for each identity where the identifiers are partitioned into multiple groups and identifiers in the same group are correlated and identifiers in different groups are not correlated;
   selecting one at a time the identifier that approximately provides the largest expected decrease in the ratio of the joint probability of responses of an impostor to the joint probability of responses of a legitimate claimant per unit cost; and
   computing by means of an interactive computer joint probabilities of responses for a legitimate claimant and for an impostor using equations $PO_r(K_g)=Q_r(K_g)=1$ for $K_g=\emptyset$, $PO_r(K_g \cup k)=PO_r(K_g)PIO_r(k=\text{outcome})$, $Q_r(K_g \cup k)=Q_r(K_g)PL_r(k=\text{outcome})$, $P_r(K)=Q_r(K)=1$ for $K=\emptyset$, $P_r(K \cup k)=P_r(K)PI_r(k=\text{outcome}|K)$, and $Q_r(K \cup k)=Q_r(K)PL_r(k=\text{outcome})$, where K is a set of identifiers, $K_g$ is a set of identifiers in group g, $PO_r(K_g)$ is the joint probability that an ignorant impostor claiming identity r would provide responses as specified by a set of identifiers $K_g$, $Q_r(K_g)$ is the joint probability that a legitimate claimant of identity r would provide responses as specified by a set of identifiers $K_g$, $PIO_r(k=\text{outcome})$ is the input estimate of the probability that an ignorant impostor claiming identity r would respond with an outcome response to identifier k where outcome could be a match, no-match, or ambiguous response, $PL_r(k=\text{outcome})$ is the input estimate of the probability that a legitimate claimant for identity r would respond with an outcome response to identifier k, $P_r(K)$ is the joint probability that a random (ignorant or well-informed) impostor claiming identity r would provide responses as specified by a set of identifiers K, and $PI_r(k=\text{outcome }|K)$ is the conditional probability that a random (ignorant or well-informed) impostor claiming identity r would respond with an outcome response to identifier $k \notin K$, given that the session so far has produced the responses of the identifiers in the set K;
   determining, using the computed joint probabilities, whether the claimant can be accepted or rejected while guaranteeing that an impostor is accepted with a probability that does not exceed a first specified parameter $\alpha$ and a legitimate claimant is rejected with a probability that does not exceed a second specified parameter $\beta$ using inequalities $p_r(K)/Q_r(K) \leq \alpha$ and $Q_r(K)/P_r(K) \leq \beta$;
   re-computing by means of the interactive computer conditional probabilities of an impostor using $$PI_r(k=\text{outcome}|K_g) = \frac{(1-\varphi_g)PO_r(K_g)PIO_r(k=\text{outcome}) + \varphi_g Q_r(K_g)PL_r(k=\text{outcome})}{(1-\varphi_g)PO_r(K_g)+\varphi_g Q_r(K_g)};$$

where $PI_r(k=\text{outcome}|K_g)$ is the conditional probability that a random (ignorant or well-informed) impostor claiming identity r would respond with an outcome response to identifier $k \notin K_g$ in group g, given that the session so far has produced the responses of the identifiers in the set $K_g$, and $\varphi_g$ is the input estimate of the probability that an impostor finds trusted information of the identifiers in group g, which make the responses as good as those of a legitimate claimant, and
   selecting a new identifier or granting access or denying access or terminating the session inconclusively.

2. The method as set forth in claim 1, wherein the approximation for the largest expected decrease in the ratio of the joint probability of an imposter of responses to the legitimate joint probability of a claimant of responses weighted by a parameter that can be changed in successive sessions is computed by the equations $$G_r(k|K_g) = PL_r(k=\text{match})\log\left(\frac{PL_r(k=\text{match})}{PI_r(k=\text{match}|K_g)}\right) +$$
$$PL_r(k=\text{no-match})\log\left(\frac{PL_r(k=\text{no-match})}{PI_r(k=\text{no-match}|K_g)}\right)$$

and $$\text{Value}_r(k) = \frac{G_r(k|K_g)}{c_r(k)},$$

where $c_r(k)$ is the parameter of identifier k for claimant of identity r.

3. The method as set forth in claim 1, wherein the claimant that cannot be accepted while guaranteeing that an impostor will be accepted with a probability that does not exceed a first specified parameter undergoes manual interrogation.

4. The method as set forth in claim 1, further comprising the step of calculating probabilities that the interrogation session of a legitimate claimant will grant access, deny access or terminate inconclusively without acceptance or rejection of the claimant.

5. The method as set forth in claim 1, further comprising the step of calculating probabilities that an interrogation session of an impostor will grant access, deny access, or terminate inconclusively without acceptance or rejection of the claimant.

6. A system for verifying the identity of a claimant attempting to access a resource comprising:
   a trusted database containing information of multiple identifiers for each identity where the identifiers are partitioned into multiple groups and identifiers in the same group are correlated and identifiers in different groups are not correlated;
   means for selecting one at a time the identifier that approximately provides the largest expected decrease in the ratio of the joint probability of responses of an impostor to the joint probability of responses of a legitimate claimant weighted by a parameter that can be changed in successive sessions,
   means for computing joint probabilities of responses for a legitimate claimant and for an impostor using equations $PO_r(K_g)=Q_r(K_g)=1$ for $K_g=\emptyset$, $PO_r(K_g \cup k)=PO_r(K_g)PIO_r(k=\text{outcome})$, $Q_r(K_g \cup k)=Q_r(K_g)PL_r(k=\text{outcome})$, $P_r(K)=Q_r(K)=1$ for $K=\emptyset$, $P_r(K \cup k)=P_r(K)PI_r(k=\text{outcome}|K)$, and $Q_r(K \cup k)=Q_r(K)PL_r(k=\text{outcome})$, where K is a set of identifiers, $K_g$ is a set of identifiers in group g, $P0_r(K_g)$ is the joint probability that an ignorant impostor claiming identity r would provide responses as specified by a set of identifiers $K_g$, $Q_r(K_g)$ is the joint probability that a legitimate claimant of identity r would provide responses as specified by a set of identifiers $K_g$, $PI0_r$(k=outcome) is the input estimate of the probability that an ignorant impostor claiming identity r would respond with an outcome response to identifier k where outcome could be a match, no-match, or ambiguous response, $PL_r$(k=outcome) is the input estimate of the probability that a legitimate claimant for identity r would respond with an outcome response to identifier k, $P_r(K)$ is the joint probability that a random (ignorant or well-informed) impostor claiming identity r would provide responses as specified by a set of identifiers K, and $PI_r$(k =outcome | K) is the conditional probability that a random (ignorant or well-informed) impostor claiming identity r would respond with an outcome response to identifier k $\notin$ K, given that the session so far has produced the responses of the identifiers in the set K;

means for determining, using the computed joint probabilities, whether the claimant can be accepted or rejected while guaranteeing that an impostor is accepted with a probability that does not exceed a first specified parameter α and a legitimate claimant is rejected with a probability that does not exceed a second specified parameter β using inequalities $P_r(K)|Q_r(K) \leq \alpha$ and $Q_r(K)|P_r(k) \leq \alpha$;

means for re-computing conditional probabilities of an imposter using $$PI_r(k = \text{outcome} \mid K_g) = \frac{(1 - \varphi_g)P0_r(K_g)PI0_r(k = \text{outcome}) + \varphi_g Q_r(K_g)PL_r(k = \text{outcome})}{(1 - \varphi_g)P0_r(K_g) + \varphi_g Q_r(K_g)};$$

where $PI_r$(k=outcome | $K_g$) is the conditional probability that a random (ignorant or well-informed) impostor claiming identity r would respond with an outcome response to identifier k $\notin K_g$ in group g, given that the session so far has produced the responses of the identifiers in the set $K_g$, and $\phi_g$ is the input estimate of the probability that an impostor finds trusted information of the identifiers in group g, which make the responses as good as those of a legitimate claimant, and means for selecting a new identifier or granting access or denying access or terminating the session inconclusively.

7. The system as set forth in claim 6, further comprising means for calculating probabilities that an interrogation session of a legitimate claimant will grant access, deny access or terminate inconclusively without acceptance or rejection of the claimant.

8. The system as set forth in claim 6, further comprising means for calculating probabilities that an interrogation session of an impostor will grant access, deny access, or terminate inconclusively without acceptance or rejection of the claimant.

9. A program storage device, readable by machine, tangibly embodying a program of instructions executable by the machine to cause the machine to perform a method for verifying the identity of a claimant attempting to access a resource comprising the steps of:

providing a trusted database containing information of multiple identifiers for each identity where the identifiers are partitioned into multiple groups and identifiers in the same group are correlated and identifiers in different groups are not correlated;

selecting one at a time the identifier that approximately provides the largest expected decrease in the ratio of the joint probability of responses of an impostor to the joint probability of responses of a legitimate claimant, weighted by a parameter that can be changed in successive sessions;

computing joint probabilities of responses for a legitimate claimant and for an impostor using equations $P0_r(K_g)=Q_r(K_g)=1$ for $K_g=\emptyset$, $P0_r(K_g \cup k)=P0_r(K_g)PI0_r(k=\text{outcome})$, $Q_r(K_g \cup k)=Q_r(K_g)PL_r(k=\text{outcome})$, $P_r(K)=Q_r(K)=1$ for $K=\emptyset$, $P_r(K \cup k)=P_r(K)PI_r(k=\text{outcome}|K)$, and $Q_r(K \cup k)=Q_r(K)PL_r(k=\text{outcome})$, where K is a set of identifiers, $K_g$ is a set of identifiers in group g, $P0_r(K_g)$ is the joint probability that an ignorant impostor claiming identity r would provide responses as specified by a set of identifier, $Q_r(K_g)$ is the joint probability that a legitimate claimant of identity r would provide responses as specified by a set of identifiers, $PI0_r$(k=outcome) is the input estimate of the probability that an ignorant impostor claiming identity r would respond with an outcome response to identifier k where outcome could be a match, no-match, or ambiguous response, $PL_r$(k=outcome) is the input estimate of the probability that a legitimate claimant for identity r would respond with an outcome response to identifier k, $P_r(K)$ is the joint probability that a random (ignorant or well-informed) impostor claiming identity r would provide responses as specified by a set of identifiers K, $PI_r$(k=outcome | K) is the conditional probability that a random (ignorant or well-informed) impostor claiming identity r would respond with an outcome response to identifier k $\notin$ K, given that the session so far has produced the responses of the identifiers in the set K;

determining, using the computed joint probabilities, whether the claimant can be accepted or rejected while guaranteeing that an impostor is accepted with a probability that does not exceed a first specified parameter α and a legitimate claimant is rejected with a probability that does not exceed a second specified parameter β using inequalities $P_r(K)|Q_r(K) \leq \alpha$ and $Q_r(K)|P_r(K) \leq \beta$;

re-computing conditional probabilities of an imposter using $$PI_r(k = \text{outcome} \mid K_g) = \frac{(1 - \varphi_g)P0_r(K_g)PI0_r(k = \text{outcome}) + \varphi_g Q_r(K_g)PL_r(k = \text{outcome})}{(1 - \varphi_g)P0_r(K_g) + \varphi_g Q_r(K_g)};$$

where $PI_r$(k=outcome | $K_g$) is the conditional probability that a random (ignorant or well-informed) impostor claiming identity r would respond with an outcome response to identifier k $\notin K_g$ in group g, given that the session so far has produced the responses of the identifiers in the set $K_g$, and $\phi_g$ is the input estimate of the probability that an impostor finds trusted information of the identifiers in group g, which make the responses as good as those of a legitimate claimant, and selecting a new identifier or granting access or denying access or terminating the session inconclusively.

* * * * *

UNITED STATES PATENT AND TRADEMARK OFFICE
CERTIFICATE OF CORRECTION

PATENT NO. : 7,730,520 B2
APPLICATION NO. : 11/443909
DATED : June 1, 2010
INVENTOR(S) : Luss et al.

It is certified that error appears in the above-identified patent and that said Letters Patent is hereby corrected as shown below:

In the Specification

In Column 3, Line 13, delete "identifiers" and insert -- identifiers. --, therefor.

In Column 9, Lines 15-18, in Equation (9), delete

"
$$PI_r(k = \text{outcome} \mid K_g) = \frac{PI_r(K_g \cup k)}{(1-PI_r(K_g))PI_r(K_g)PIO_r(k = \text{outcome}) +}$$

$$= \frac{\varphi_g Q_r(K_g) PI_r(k = \text{outcome})}{(1-\varphi_g)PO_r(K_g) + \varphi_g Q_r(K_g)},$$
" and insert $$PI_r(k = \text{outcome} \mid K_g) = \frac{PI_r(K_g \cup k)}{PI_r(K_g)} =$$

$$\frac{(1-\varphi_g)PO_r(K_g)PIO_r(k = \text{outcome}) + \varphi_g Q_r(K_g)PL_r(k = \text{outcome})}{(1-\varphi_g)PO_r(K_g) + \varphi_g Q_r(K_g)}$$

--, therefor.

Signed and Sealed this
Eleventh Day of November, 2014

Michelle K. Lee
*Deputy Director of the United States Patent and Trademark Office*